July 13, 1954  A. L. MELESKI  2,683,871
ELECTRICAL SIGNAL DEVICE MOUNTING AND INSTALLATION
Filed Aug. 8, 1951  3 Sheets-Sheet 1
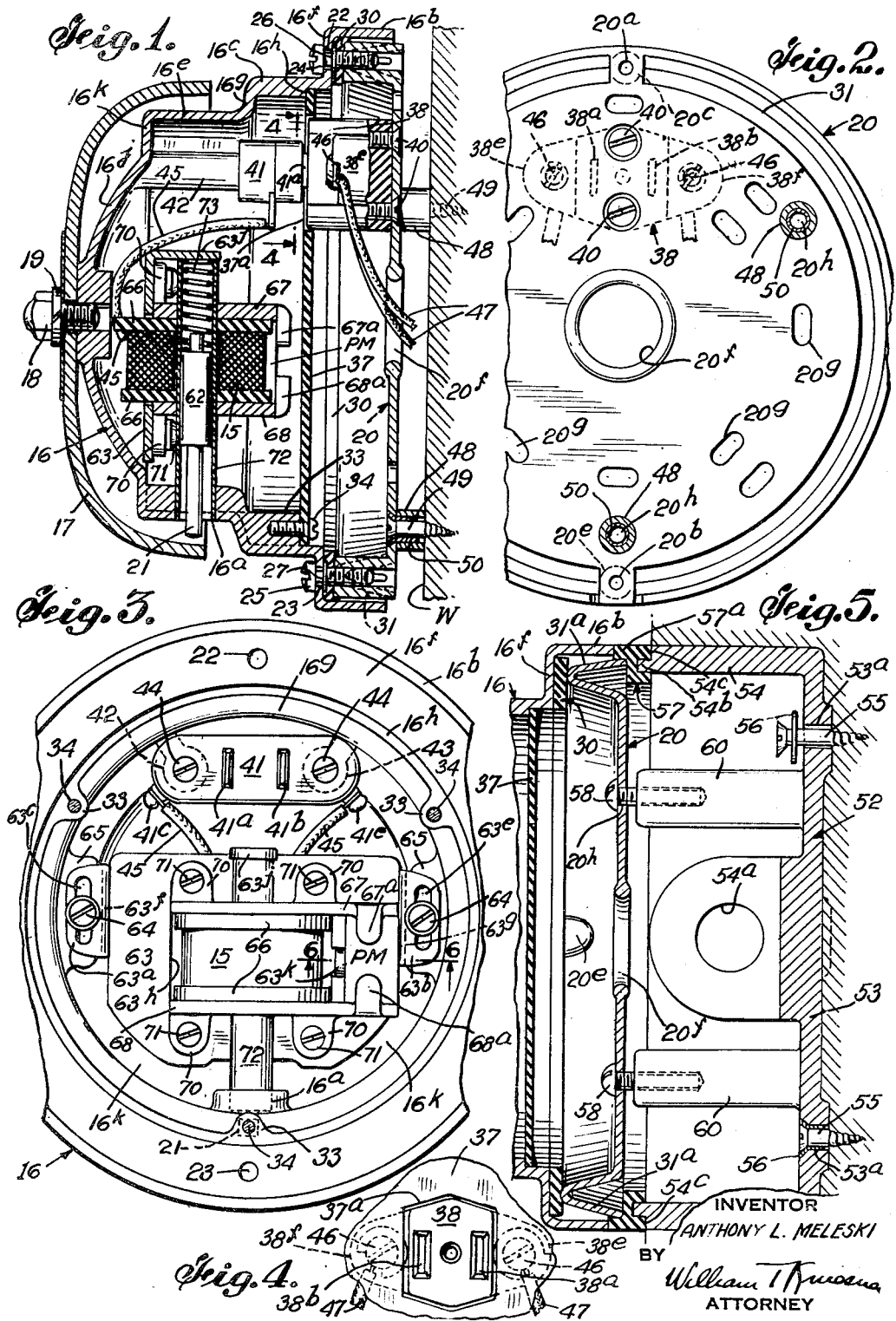
INVENTOR
ANTHONY L. MELESKI
BY
William T. Kinsana
ATTORNEY

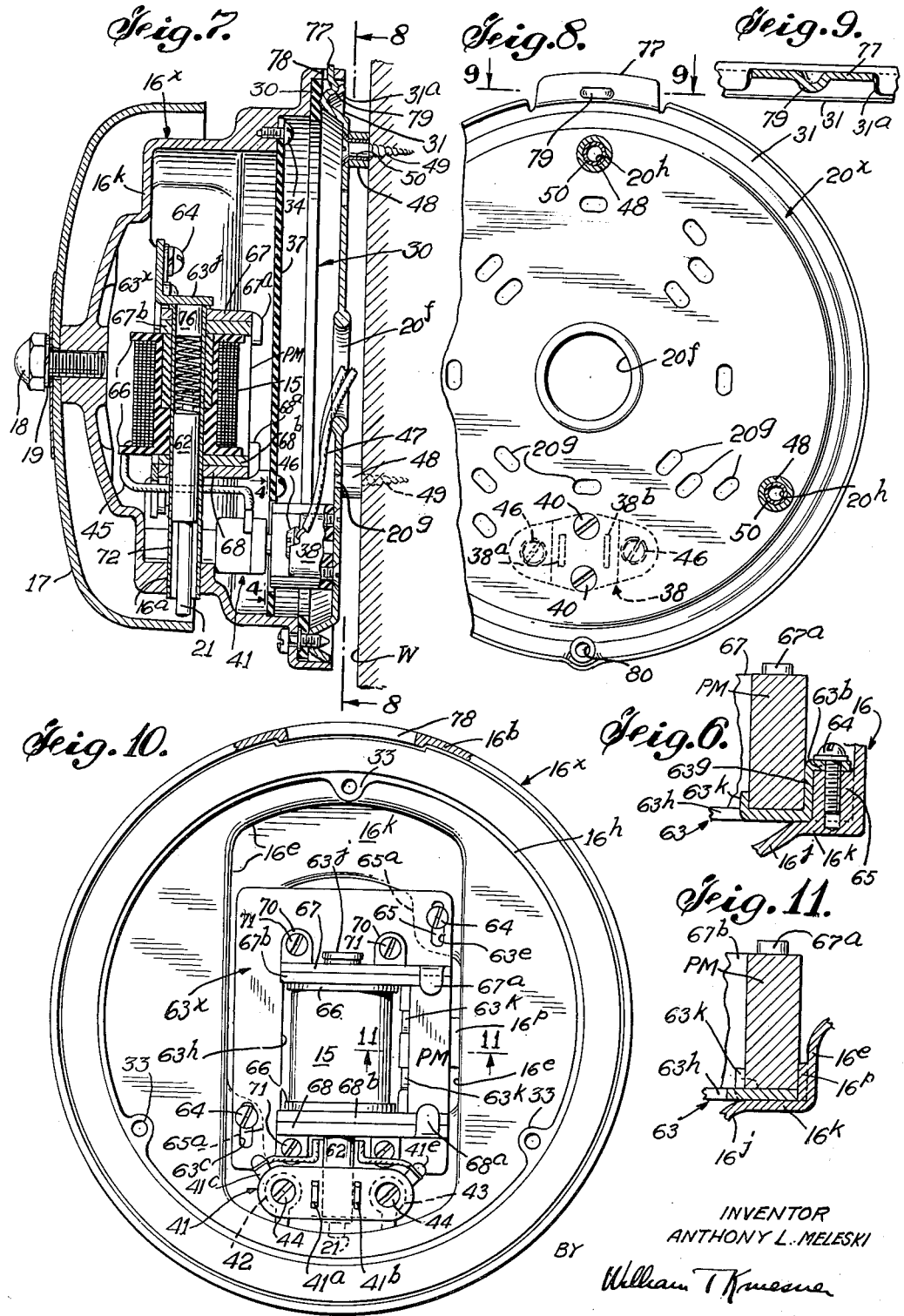

July 13, 1954  A. L. MELESKI  2,683,871
ELECTRICAL SIGNAL DEVICE MOUNTING AND INSTALLATION
Filed Aug. 8, 1951  3 Sheets-Sheet 3

INVENTOR
ANTHONY L. MELESKI
BY William T. Knosner
ATTORNEY

Patented July 13, 1954

2,683,871

UNITED STATES PATENT OFFICE 2,683,871

ELECTRICAL SIGNAL DEVICE MOUNTING AND INSTALLATION

Anthony L. Meleski, New York, N. Y., assignor to Edwards Company, Inc., Norwalk, Conn., a corporation of New York Application August 8, 1951, Serial No. 240,958

19 Claims. (Cl. 340—396)

This invention relates to signaling devices, particularly electrical signaling devices such as electric gongs, bells, and the like, and more particularly to the housing, mounting, and installation of electric signaling devices.

This application is a continuation-in-part of my application Serial No. 142,430, filed February 4, 1950, now abandoned.

One of the objects of this invention is to provide housing and mounting means for such devices suitable for either indoors or outdoors. Another object is to provide a housing construction for electric signaling devices, particularly of the audible type, that will have ready adaptability and that will also have good adaptability for meeting various requirements for installation or mounting in practical use.

Another object is to provide a support for signaling devices of the above-mentioned character and a mounting means therefor which can be embodied in simple, economical, and compact structural form and which may be readily assembled and mounted.

Another object is to provide a construction of the above-mentioned character which will provide a wide range of adaptability of installation in relation to various types of wiring systems with which the electric signaling device is to be associated, while at the same time retaining the advantages of ease, simplicity, and dependability of assembly. Another object is to carry out this last-mentioned object with structural features embodying relatively few parts and so interrelated as to achieve practical foolproofness in carrying on and completing any given installation.

Another object is to provide an inexpensive and practical housing and signaling device assembly which will be capable of economical manufacture and ease of assembly, and constructed and arranged to coact with a mounting means therefor to insure ease and dependability of installation and, in its preferred form, to be capable also of wide adaptability to various mounting and wiring requirements. More particularly, another object is to provide a signaling device assembly and mounting of the just-mentioned character to carry a gong or the like or other sound-emitting device externally and electrical actuating mechanism therefor internally, embodying structural features facilitating assembly and setting thereof in relation to each other and including in the mounting means dependable provision for insuring installation without detrimental impairment of the signal actuation and action.

Other objects will be in part obvious or in part pointed out hereinafter.

The invention accordingly consists in the features of construction, combination of elements, and arrangement of parts as will be exemplified in the structure to be hereinafter described and the scope of the application of which will be indicated in the following claims.

In the accompanying drawings in which are shown two illustrative embodiments each having adaptability to various types of installation and wiring systems and in which similar reference characters refer to similar parts throughout.

Figure 1 is a central vertical sectional view of one illustrative form of signaling device support or housing assembled to its mounting plate and illustratively thereby mounted on a wall to illustrate a surface-mounted installation;

Figure 2 is a rear elevation of the mounting plate as seen from the right in Figure 1, with the mounting plate partly broken away and being shown disassembled from the rest of the mechanism;

Figure 3 is a rear elevation of the device as seen from the right in Figure 1 with the mounting plate and the insulating separator plate removed, showing in elevation certain features of the assembly, to form a subunit, of the signaling device and its housing-like support;

Figure 4 is an elevation as seen along the line 4—4 of Figure 1 showing certain relationships between a connector element of the mounting plate subassembly and the signaling device subassembly, that relationship being also embodied in other forms shown in the drawings as indicated by the line 4—4 of Figure 7 and also of Figure 9;

Figure 5 is a fragmentary horizontal sectional view through the assembled signaling device subassembly and mounting plate subassembly of Figure 1, showing them secured to or mounted on a special form of outlet box;

Figure 6 is a fragmentary horizontal sectional view as seen along the line 6—6 of Figure 3 showing certain preferred structural features where the signal-actuating means utilizes a permanent magnet;

Figure 7 is a central vertical sectional view, on a somewhat smaller scale, of a modified form of signal-actuating mechanism and housing subassembly coacting with a modified form of mounting plate, all shown in Figure 7 as secured, illustratively, to a wall surface as in a surface-mounted installation;

Figure 8 is an elevation as seen along the line 8—8 of Figure 7, partly broken away, showing more particularly the mounting plate subassembly and certain structural features of coaction thereof with the housing subassembly;

Figure 9 is a detached fragmentary horizontal sectional view as seen along the line 9—9 of Figure 8.

Figure 10 is an elevation as seen from the right in Figure 7 of the signaling device and housing subassembly as it is seen detached from the mounting plate subassembly and with the insulating separator plate removed, being also partly in section;

Figure 12:
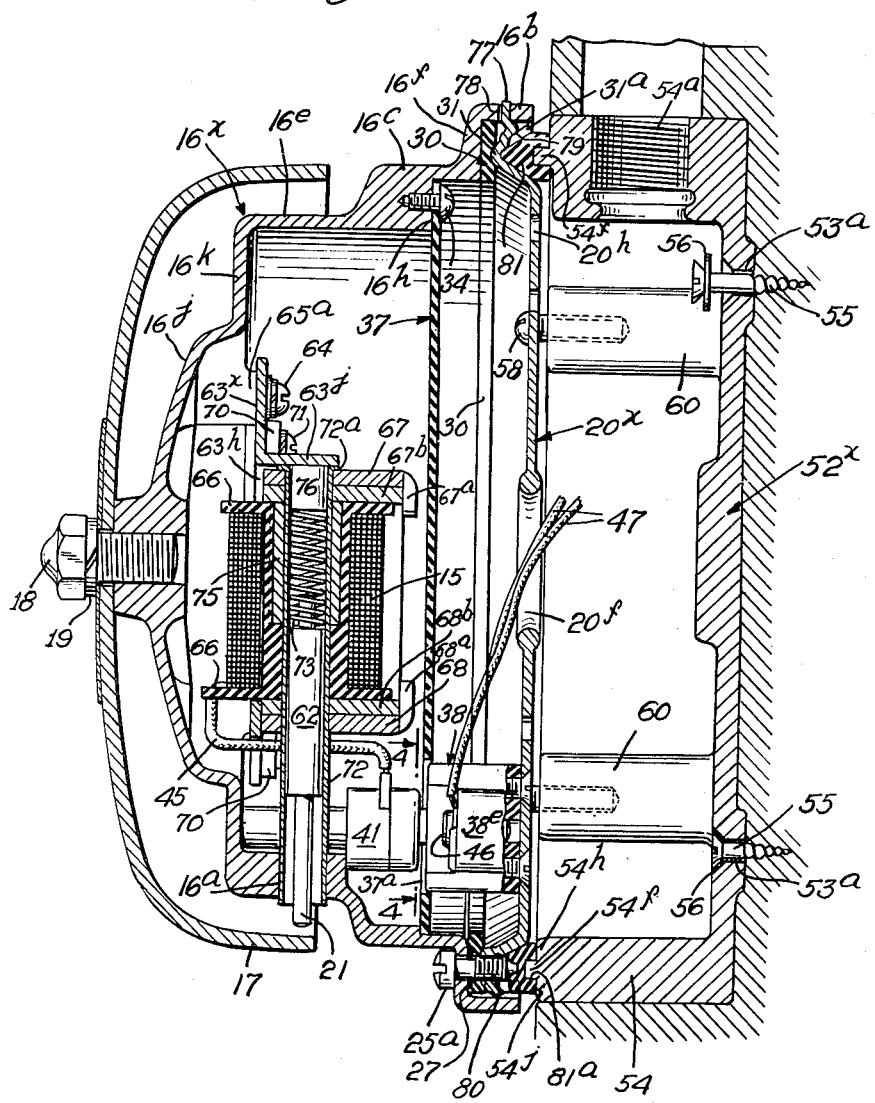

Figure 11 is a fragmentary sectional view as seen along the line 11—11 of Figure 10 showing certain structural features of assembly where the electric signal-actuating means embodies a permanent magnet, and Figure 12 is a vertical sectional view like that of Figure 7 but on an enlarged scale, showing the assembled signaling subassembly and mounting plate subassembly in coacting relationship with a special form of outlet box.

Referring first to Figures 1 and 3, the electric signaling device, for purposes of illustration of certain features of my invention, comprises an electromagnetic winding 15 which is to be connected to an electric circuit and which forms part of a signal-actuating mechanism which is to be suitably mounted and supported in the desired location and which preferably forms part of a subassembly of which another part comprises a main support which is preferably constructed in the form of a housing generally indicated by the reference character 16 and within which the electrical actuating mechanism is mounted and secured. In the illustrative embodiment the signaling device is of the audible type such as a bell and in such case it is provided with a gong 17 which is preferably and conveniently mounted externally of the housing 16. As is better shown in Figure 1, the housing 16, which is somewhat dome-shaped, has a substantial portion thereof extending into and enveloped by the end or peripheral portions of the gong which may be secured to the housing as by a cap screw 18 provided with a suitable spring lock washer 19 threaded into a suitably reinforced portion of the housing 16. The latter, as appears also from Figure 3, is generally circular in section and in the illustration the gong 17 is mounted coaxially with the housing 16.

The signal device and its support or housing, assembled in the form of a subassembly as is later described, are to be mounted to a suitable support such as the vertical face of a wall, either directly thereto, as to the wall W in Figure 1 where the circuit wiring may be so-called exposed surface wiring, or to the usual type of outlet box usually recessed in a wall where the wiring may be of the concealed or conduit type, or for outdoor or weatherproof mounting in sealed relation to a coacting outlet box provided with weatherproof conduit or like wiring. To facilitate such mounting, of which the just mentioned illustrate a variety of requirements to be met, a mounting plate generally indicated by the reference character 29 (Figures 1 and 2) is provided, constructed and coacting as later described. For many installations, particularly for outdoor use and where the signaling device comprises an externally-mounted gong as in Figure 1, it is preferable that the gong striker part of the internally-mounted electric actuating mechanism have access to the gong through a lowermost portion of the housing and, as better shown in Figures 1 and 3, I provide an aperture 16ª in the wall of the housing 16 itself and through the aperture 16ª the gong striker 21 is actuatable to impact the gong 17. For this and other advantages I also make provision, as is later described, to insure that the housing and signaling subassembly are assembled to the mounting plate consistently in the desired relationship.

The housing 16 which is desirably die-cast, while substantially dome-shaped, is stepped, its side wall having a plurality of setbacks; thus it has a plurality of substantially cylindrical wall portions 16ᵇ, 16ᶜ, and 16ᵉ of successively different diameters joined by intermediate or laterally-extending annular wall portions 16ᶠ and 16ᵍ the planes of which are conveniently substantially at right angles to the axis of the housing. A similar lateral portion 16ᵏ joins portion 16ᵉ to the end partially-spherical portion 16ʲ. The portions 16ᶠ, 16ᵍ, and 16ᵏ form transverse flange-like ledges and are adapted to coact with other parts as later described.

The portion 16ᶠ (Figure 1) is of appropriate radial extent externally to be provided with diametrically-opposed holes 22 and 23 and to accommodate the heads of screws 24 and 25, respectively, which extend through the holes and are held against movement out of the holes by split rings 26 and 27, respectively; the screws 24 and 25 are thus held assembled to the housing while being freely rotatable relative thereto and their threaded shanks extend rearwardly (to the right in Figure 1) to an extent less than the axial extent of the housing portion 16ᵇ. The threaded ends of the screw thus terminate well within the plane of the rear end of the housing and, if desired, they may be provided with reduced-diametered end portions for ease of entry into diametrically-opposed threaded holes 20ª and 20ᵇ (see Figure 2) of the mounting plate 20. The casing portion 16ᶠ also forms an annular seat for a cushioning and sealing gasket ring 30 preferably made of rubber and of substantial thickness, and coacting to hold the ring 30 in place is the casing portion 16ᵇ against which the ring 30 peripherally engages. Ring 30 is provided with diametrically-opposed apertures through which the screws 24 and 25 pass. These apertures may be made smaller than the pitch diameter of the threaded shanks of the screws so that the ring 30, even though it fits snugly within the cylindrical casing portion 16ᵇ, is thereby held against dislodgement from its seat, and this arrangement may also be used to hold the screws 24 and 25 against dislodgement from their holes. These features are of advantage with or without the split rings 26 and 27 in maintaining assemblage of these parts during handling and packaging as well as during installation and attachment to the mounting plate.

The mounting plate 20, which may be a stamping but is preferably of die-cast construction, is disc-like or circular and is of a maximum diameter somewhat less than the internal diameter of the end casing portion 16ᵇ (Figure 1), and adjacent its periphery and projecting out of its plane the plate 20 is provided with an annular flange 31 which in its preferred form is V-shaped in cross section as is shown in full lines in Figure 5 and in broken lines in Figure 1. In horizontal or axial dimension as seen in Figures 1 and 5 the casing end flange or portion 16ᵇ and the mounting plate flange 31 are about the same so that with the annular apex of the V-shaped flange 31 resting against the rubber ring 30 and the screws 24 and 25 threaded into the mounting plate holes 20ª and 20ᵇ, the yieldable ring 30 may be compressed to the desired extent before the end edge of casing portion 16ᵇ reaches the plane of the rear face of the mounting plate 20 as the two parts are telescoped together under the tightening action of the two screws. Adequate compression of the ring 30 is thus always assured even though mounting plate 20 may rest flush against a wall face or the like. The screw holes 20ª and 20ᵇ of the mounting plate 20 (Figure 2), in the illustrative embodiment, pass through the apex of the V-shaped flange 31 and preferably the latter is provided with bosses 20ᶜ and 20ᵉ which fill in the trough on the rear side of the V-shaped flange at the selected diametrically-opposed points so as to provide greater axial length and more metal for the screw holes 20ª and 20ᵇ.

Between the transverse or flange-like casing portions 16ᵍ and 16ᶠ (Figure 1) the inner surface of the cylindrical wall portion 16ᶜ is internally stepped or rabbetted circumferentially as at 16ʰ (Figures 1 and 3) and at spaced intervals therealong is provided a plurality of bosses 33 (Figure 3), illustratively three in number, provided with threaded holes to receive screws 34. In the step or rabbet 16ʰ is seated a disc-like insulating plate 37 (Figure 1) and it is held in place by the screws 34. Plate 37 closes off the interior of the casing 16 and covers over the apparatus and mechanism mounted therein, as about to be described; the separator plate 37 serves also to exclude dust and the like from the interior of the housing and to prevent installation wires associated with the mounting plate 20, as is later described, from contacting the electric signal-actuating mechanism contained within the housing 16; it also shields the signaling mechanism during handling or installation of the housing and signaling subassembly.

In its preferred form the separator plate 37 also coacts with the mounting plate subassembly to insure the desired orientation of the former relative to the latter, upon installation. For this purpose I preferably provide the mounting plate with an aperture 37ª (Figures 1 and 4) which is off-center and radially displaced from the center of the disc-like plate 37. Aperture 37ª, as is better shown in Figure 1, is adapted to just receive therein the foremost or front end portion of a socket or receptacle 38 that is of any suitable construction, usually made of insulating material, and provided with sockets 38ª and 38ᵇ for the disconnectible reception of two contact prongs; these sockets 38ª and 38ᵇ are in the front or left-hand end face, as seen in Figure 1, of the receptacle part 38 and, through the aperture 37ª, are thus presented to the interior of the housing 16. The receptacle part 38 is secured to the front face of the mounting plate 20 as by screws 40 (Figure 1) threaded into it and passing through suitable holes in the mounting plate 20 and countersunk in the rear faces thereof (Figures 1 and 2). Like the aperture 37ª in the separator plate 37, receptacle part 38, in securing it to the mounting plate 20, is similarly off-center and radially displaced from the center of the mounting plate. Illustratively and as shown in Figures 1 and 2, aperture 37ª is off-center along the diameter along which the screws 24 and 25 are diametrically opposed, and the receptacle part 38 is similarly off-center but along the diameter along which screw holes 20ª and 20ᵇ of the mounting plate 20 are aligned.

Accordingly, with the housing 16 and mounting plate 20 circular in the described embodiments, the aperture 37ª in the separator plate 37 and the forwardly projecting part of the receptacle member 38 prevent, during assembly, such relative rotary displacement between the casing 16 and the mounting plate 20 as would misalign the diametrically-opposed screws in the one end screw holes in the other and thus entry of the screws into their respective holes in the mounting plate is greatly expedited, virtually eliminating the need for manual exploration during installation. This action is aided by the coaction of the frusto-conical face of the outer portion of the V-shaped flange 31 with the peripheral flange portion 16ᵇ of the casing 16 in achieving concentricity of interrelationship of the two parts as the one is assembled to the other; these actions are of further advantage where, as is usually the case, the mounting plate 20 is fastened in position at a substantial height from the floor. Of coacting aid in these actions are also the two contact prongs 41ª and 41ᵇ of a plug connector element 41 which is mounted within the casing 16 in a position to project the plug prongs through the aperture 37ª in the separator plate so that as the casing subassembly and the mounting plate subassembly are brought together as above described, the plug prongs 41ª, 41ᵇ enter the recesses or sockets 38ª, 38ᵇ of the receptacle part 38 carried by the mounting plate 20. The plug member 41 may be of any suitable construction and usually comprises a body of insulating material from which the plug prongs project and having suitable connecting devices such as metal tabs 41ᶜ and 41ᵉ (Figure 3) to which external electrical connection is made to the plug prongs. In the illustrative embodiment the plug member 41 is mounted in position as shown in Figures 1 and 3, juxtaposed to the aperture 37ª in the separator plate 37, by means of two spaced bosses 42 and 43 formed or cast integrally with the interior wall of the casing 16, forming in effect extensions of the internal annular ledge formed by the casing portion 16ᵍ; the plug member 41 rests against the aligned faces of these parts and is secured thereto by screws 44 (Figure 3). The plug prongs 41ª, 41ᵇ thus project through the separator plate aperture 37ª but they terminate short of the plane of the inner otherwise open end of the casing 16, being thus protected during handling, packaging, and the like by those portions of the casing including the end portion 16ᵇ that extend rearwardly beyond the plane of the separator plate 37. To the connector tabs 41ᶜ, 41ᵉ (Figure 3) are connected the conductors 45 that lead to the electric signaling mechanism, to the electromagnetic winding 15 in the illustrative embodiment.

The receptacle part 38 forming part of the mounting plate subassembly is provided with binding posts to which the heavier circuit conductors of the wiring system are connected, and these binding posts preferably take the form of a pair of screws 46 respectively accommodated in the front faces of wing-like lateral extensions 38ᵉ and 38ᶠ (Figure 2) of the main body part of the plug receptacle member 38, these wing-like extensions being of lesser dimension than the main body part of the receptacle as is better shown in Figure 1. In any suitable manner the binding screws 46 are internally in electrical connection with the internal contacts with which the plug prongs 41ª, 41ᵇ engage when they are entered into the sockets 38ª, 38ᵇ.

The mounting plate 20 is provided with a central round hole 20ᶠ (Figures 1 and 2) through which the circuit conductors are passed when the mounting plate subassembly is secured in position; in Figure 1 conductors 47 of the system or circuit wiring are shown passed through the hole 20ᶠ and they are connected respectively to the binding screws 46 of the receptacle part 38; this is done when the mounting plate 20 is secured in position, it being noted that the binding screws are conveniently exposed at the front face of the mounting plate for ease of electrical connection. The mounting plate 20 is constructed to meet a wide range of installation or wiring requirements or standards. For example, it is provided with a goodly number of appropriately distributed holes or slots 20ᵍ (Figure 2) so located that the plate 20 may be secured directly, as a closure plate, to any of the standard or like outlet boxes whether surface-mounted or recessed in the wall or flush-mounted in the wall; the holes are preferably so located that the circular mounting plate 20 is substantially centered to such an outlet box, thus insuring free and easy passage of the circuit conductors 47 from the box through the mounting plate aperture 20ᶠ whence they are connected to the binding screws 46.

Also, the mounting plate subassembly is constructed so that it may be installed on a wall surface for use in connection with so-called exposed surface wiring and in such case provision is made to mount it in spaced relation from the face of the wall W as shown in Figure 1. Preferably the mounting plate 20 is provided with holes 20ʰ (Figure 2); these holes 20ʰ may be distributed in any suitable manner and preferably they are three in number and disposed in triangular relation. At each hole is secured, to the rear face of the mounting plate 20, so as to form a part of the mounting plate subassembly, an annular stud or spacer 48. The spacers 48 are secured coaxially with their respective holes 20ʰ so that screws 49 (Figure 2) may be passed through the holes and spacers and threaded into the wall W, thus securing the mounting plate subassembly to the wall with sufficient space therebetween to accommodate the surface wiring and to extend the circuit to the aperture 20ᶠ for the passage of the conductors 47 to the front side of mounting plate 20 for connection to the plug receptacle binding screws 46.

Preferably the spacing studs 48 are secured to the plate 20 in a manner to permit them to be readily removed; illustratively, and as shown in Figure 1, I may employ a bushing 50 like an eyelet which has one portion press-fitted into the hollow spacer 48 and another portion spun or expanded, initially or during assembly, over the front face of the plate 20 about the hole 20ʰ. The screws 49 pass through the bushing 50 as well as through the spacer 48, as shown in Figure 1, and where the bushing is made of a soft metal like soft brass or copper, it has a further advantage of yielding under the tension of the screw head and forming a good securing seat thereagainst for the screw. Part 50 may also be made of a non-metallic material, like fibre. Where the spacer members 48 are not needed, as for example when the installation is to be made directly to a usual or standard outlet box as above described or to the outlet box about to be described, the annular spacers are simply knocked off, the securing bushing or eyelet 50 readily yielding for this purpose.

Furthermore, the mounting plate subassembly is also constructed to coact to achieve a sealed installation, as for example for certain types of outdoor uses or installations or other locations where it is desired or necessary to seal the housing to an outlet box. One such illustrative embodiment is shown in Figure 5 in which is shown an outlet box 52 having a base or back wall 53 and a cylindrical side wall 54 of a diameter commensurate with that of the end casing portion 16ᵇ; the box 52 may be of cast construction and in its side wall it has one or more threaded holes 54ᵃ to receive a pipe or conduit through which the circuit conductors are led into the box. Box 52 is secured to its support in any suitable manner, preferably weatherproof; for example, it may be fastened on the face of a wall or recess in a wall and it may be provided with suitable holes 53ᵃ in its back wall to receive securing screws 55 which are provided with sealing washers 56, which may be of fiber.

The front edge face of the cylindrical wall 54 is rabbeted as shown in Figure 5 to provide a forwardly projecting annular rib 54ᵇ whose diameter closely approximates the diameter of the outer frusto-conical part 31ᵃ of the V-shaped rib and to provide an annular seat or face 54ᶜ that substantially matches the end annular face of the end portion 16ᵇ of the housing 16. A sealing washer 57 made of any suitable yieldable material, preferably and illustratively of rubber and having a cross-section preferably like that shown in Figure 5, is interposed between the parts 16ᵇ and 31ᵃ and the ribbed or rabbeted annular end face of the outlet box side wall 54. As shown, the gasket ring 57 has an annular recess into which the annular rib 54ᵇ snugly fits; this has the advantage of permitting ease of attachment of the gasket ring 57 to the periphery of the outlet box in that the interfitting of the ring with the rib 54ᵇ achieves a gripping of the latter by the yieldability or resiliency of the ring itself and accordingly the workman, after installation of the outlet box 52 itself and before assembling the mounting plate subassembly thereto, simply seats the gasket ring 57 against the outlet box periphery, interfitting the two parts as just described, whence the rubber ring remains in position and is ready to receive the mounting plate thereagainst.

The mounting plate subassembly comprising the mounting plate 20 with the spacer elements 48 removed therefrom as above described and with the plug receptacle 38 forming a part thereof is now seated against the gasket ring 57 after bringing the circuit conductors through the aperture 20ᶠ in the mounting plate, whereupon the relatively heavy flange portion 57ᵃ of the gasket ring serves in effect to center the mounting plate 20 relative to the round outlet box 52 in that the outer wall 31ᵃ of the V-shaped flange is just receivable within the heavy rubber flange 57ᵃ whence the mounting plate subassembly is secured to the outlet box by screws 58 that pass through suitable holes in the plate 20 and are threaded into internal bosses or pillars 69 provided internally of the box 52 and preferably cast integrally therewith. The screws and pillars are preferably three in number, the holes in plate 20 for screws 58 are preferably the above-described holes 20ʰ from which the spacer elements 48 have been removed, and the pillars 69 are correspondingly located, illustratively at the apex of a triangle. The screws 58 are sufficiently tightened up to effect suitable compression of the portion of the gasket ring 57 that intervenes the part 31ᵃ of the V-shaped flange 31 and the front face of the rib 54ᵇ. The circuit conductors are then connected to the binding screws 46, 46 of the plug receptacle.

The casing and signaling mechanism subassembly is now assembled to the installed mounting plate subassembly in the manner above described in connection with Figure 1, but now the end annular face of the casing portion 16$^b$ is brought flatwise against the rib-like portion 57$^a$ of the gasket ring 57 so that upon tightening the screws 24 and 25, the gasket ring 30 and the outer heavy portion of the gasket ring 57 are compressed to effect sealing. The former is compressed between the convex annular apex of the V-shaped flange 31 and the casing wall portion 16$^f$ and the latter is compressed between the end face of casing portion 16$^b$ and the face of the rabbet 54$^c$, the latter action complementing the compression of the intermediate portion of gasket ring 57 between the flange part 31$^a$ and the rib 54$^b$ that was effected when the mounting plate subassembly was secured to the outlet box.

In any such installations various of the coacting features of construction above described make it possible to make certain that the signaling mechanism associated with the housing 16 is not installed in inverted position, and in the illustrative embodiments the housing opening 16$^a$ (Figure 1) through which the striker 21 actuates the gong 17 will always be in lowermost position, a position which is of advantage in a weatherproof installation or which might be necessitated or desirable because of the characteristics of the electric actuating mechanism. In the mechanism shown in Figures 1 and 3, the signal actuator has a vertical stroke; the striker 21 is secured to the lower end of a paramagnetic plunger 62 which is vertically reciprocable and is constructed as part of a subunit assembled to and within the casing 16.

This subunit comprises a base plate 63 of non-magnetic material such as brass, shaped as indicated in Figure 3, to be let down into and to be received in the narrower or restricted portion of the stepped casing 16, preferably to an extent such that, as shown in Figure 1, the plane of its bottom face coincides with the plane in the internal ledge 16$^k$ of casing 16; plate 63 has lateral extensions 63$^a$ and 63$^b$ (Figure 3) which overlie the ledge 16$^k$ to which plate 63 is secured by screws 64 passing through parallel slots 63$^c$ and 63$^c$ and thereby into bosses 65 formed in the upper face of the casing ledge portion 16$^k$ to increase the thickness of the latter to receive the screws, as is better shown in Figure 6, thus avoiding penetration of the casing wall portion 16$^k$ by the screw holes. Because of the increased thickness of the ledge 16$^k$, the lateral plate extensions 63$^a$ and 63$^b$ are joined to the plate 63 by right-angled bends 63$^f$ and 63$^g$, as is better shown in Figure 6.

In the illustrative embodiments the signal-actuating mechanism comprises the winding 15 above mentioned and coacting therewith a permanent magnet PM the fluxes of both of which coact to control the movement of the plunger 62. The permanent magnet PM is illustratively and conveniently in the form of a rectangular block made of a suitable alloy such as Alnico capable of being magnetized to high and permanent intensity. It is desirably mounted and secured in position in a manner by which machining of the block can be avoided and preferably by means that coact with the mounting of the subunit and the base plate 63 thereof in the well or restricted portion of the casing 16. As shown in Figure 3 and also in Figure 6, the permanent magnet PM rests with its bottom face against the plate 63 and with a portion of its right-hand side face against the right-angled bend or flange 63$^g$ by the extension 63$^b$ of which the plate 63 is secured by screws 64 to the casing 16. The plate 63 is cut away centrally and in rectangular shape, as at 63$^h$, Figure 3, to provide a recess or aperture through which a portion of the solenoid winding 15 with its end insulating discs or plates 66 can project and at one end of the opening 63$^h$ to provide also one or more upstanding ears or lugs 63$^k$, as shown in Figure 3, to engage against the opposite side of the permanent magnet PM, as is indicated also in Figure 6.

The block-like permanent magnet PM is engaged at its opposite ends by end plates 67 and 68 which are provided with right-angled lugs or ears 70 that rest flatwise against the base plate 63 to which they are secured by screws 71, thus holding the magnet block PM against shifting in up-and-down direction as viewed in Figures 1 and 3. Plates 67 and 68 are provided with bent-over ears or lugs 67$^a$ and 68$^a$ which overlie the top face of the magnet block PM and thus hold it against movement away from the base plate 63.

End plates 67 and 68 are made of steel or other suitable paramagnetic material and form extension poles for the permanent magnet PM to form a flux gap within which is the winding 15, as better appears in Figure 1, so that the permanent magnet flux and that of the winding 15 can coact along the axis of the solenoid winding within the channel or bore of which, and subjected to the coacting fluxes, is the plunger 62. The latter is suitably mounted and guided for reciprocation, by means of a tube 72 of non-magnetic material, preferably brass. This tube passes through the bore of winding 15 and through suitable apertures in the insulating end plates 66, 66 and is carried by the paramagnetic end plates 67, 68 which are coaxially apertured to receive the brass tube 72 with a press-fit, with the tube extending to both sides of the thus assembled winding and pole extensions. In the upper end of guide tube 72 is a coiled spring 73 one end of which abuts against the plunger 62 and the other end of which abuts against a bent-up flange 63$^j$ of the base plate 63, flange 63$^j$ also fixing the position of the guide tube 72 relative to the remaining parts. If desired, flange 63$^j$ and tube 72 may be secured together in any suitable way, as by soldering, though axial displacement of the tube 72 is adequately prevented by the press-fit thereof in the pole plates 67 and 68 and in the heavy insulating plates 66, 66. The conductors 45, 45 (Figures 1 and 3) are connected to the terminals of the winding 15 at the underside of the base plate 63, thus completing the signal-actuating subunit, ready for assembly to the casing 16.

The bottom aperture 16$^a$ (Figures 1 and 2), in the casing portion 16$^e$, is of a diameter to receive the free end of guide tube 72 and is of substantial axial extent, made so by thickening the casing wall portion 16$^e$ by casting a boss integrally therewith as is clearly shown in Figures 1 and 3. The signaling unit is let down into the casing, the conductors 45, 45 are secured or soldered to the connecting tabs 41$^c$ and 41$^e$ of the connector block 41, and the unit is then slid along the supporting ledges in the casing so as to enter the free end of guide tube 72 in the long round hole 16$^a$ in the casing, whence the screws 64, 64 are inserted through the slots 63ᶜ, 63ᵉ and into the threaded holes in the casing ledge and they are tightened up, preferably after testing the mechanism in its action upon the gong 17, by energizing the winding 15 with alternating current of, for example, 60 cycles, thus to achieve the optimum setting of the parts. The plunger 62 is reciprocable to move its upper end as seen in Figure 1 toward and away from the permanent magnet pole extension 67 while its lower end portion, during reciprocation, remains within the aperture of the other pole piece 68 for radial flux flow therebetween. The flux of the permanent magnet, when winding 15 is de-energized, exerts an upward pull on the core or plunger 62 tending to lessen the axial flux gap between the upper end of the plunger and the extension pole 67, against the action of spring 73 which may thereby be somewhat compressed, and thus the striker 21 is held by the flux of the permanent magnet in withdrawn position and out of contact with the gong 17.

When winding 15 is energized by pulsating or alternating current, the flux of the solenoid winding 15 aids or opposes that of the permanent magnet PM and in coaction with the spring 73 effects synchronous reciprocation of the core and striker 21. The resultant action is powerful, so much so that it is of advantage to maintain the line of reciprocation of the plunger 62 substantially vertical, thus also lessening the effects of friction and wear; the above-described features of assembly of the signaling mechanism and housing as one subunit to the mounting plate subunit insure the achievement of such vertical relationship of plunger actuation in a thoroughly dependable, practical, and foolproof manner.

In Figures 7 to 12 I have shown a modified form of construction and embodying also additional features of construction and coaction, particularly adaptable for signaling constructions and installations of larger size and power than are above described, and in Figures 7 to 12 the same reference characters are used as are employed in connection with Figures 1 to 6 to indicate like or similar parts, excepting that the housing in Figures 7 to 12 is generally indicated by the reference character 16ˣ, the mounting plate by the reference character 20ˣ, and the signaling mechanism base plate by the reference character 63ˣ. As will be clear from the applied reference characters, the various portions of housing 16ˣ correspond generally with those described in connection with Figures 1 to 6, excepting that where the wall portion 16ᵉ of housing 16 of Figure 1 is cylindrical throughout, in the modified form and as is better shown in Figures 7 and 10 the wall portion 16ᵉ is arcuate at its upper and lower ends and is parallel-sided along chords of its circle, as is better shown in Figure 10 more compactly to accommodate the illustrative signal-actuating mechanism there employed. The base plate of the latter is generally rectangular (Figure 10) and can rest directly upon the internal ledge formed by the transverse wall portion 16ᵏ to which it is adjustably secured by screws 64 extending through slots 63ᶜ and 63ᵉ and threaded into bosses 65ᵃ that provide a suitable mass of metal to accommodate the screws without penetrating the casing wall. By shaping the wall 16ᵉ of the casing 16ˣ as just described, I am enabled to simplify the construction of the base plate 63ˣ, eliminating the right-angled bends and extensions 63ᶠ—63ᵃ and 63ᵍ—63ᵇ of Figure 3, and I am also enabled to simplify the positioning and securing of the permanent magnet PM. As in the earlier form described, the permanent magnet PM rests with its bottom face against the plate 63ˣ which is cut away or apertured as at 63ʰ to provide one or more lugs 63ᵏ bent upwardly as seen in Figure 10 (see also Figure 11) to engage one side of the magnet block, and the latter is held down against the plate 63ˣ by lugs 67ᵃ and 68ᵃ of the paramagnetic end plates 67 and 68 which in this form also overlie and hold down edgewise against the base plate 63ˣ companion pole extension plates 67ᵇ and 68ᵇ, the latter being in effect duplicates of pole extension plates 67 and 68 but without the lugs and ears in order to provide a greater cross-section for carrying the flux of the permanent magnet as better appears from Figures 7 and 12. At the right-hand side face of the permanent magnet PM (Figure 10) the base plate 63ˣ need not be supplied with any upstanding flange or lug and, instead, I utilize the adjacent housing wall 16ᵉ to hold the magnet block against dislodgement in a direction to the right as viewed in Figure 10, and for this purpose the inside face of wall 16ᵉ is provided with a boss 16ᵖ which presents a small magnet-engaging face parallel to the base plate slots 63ᶜ, 63ᵉ and so spaced from the line of adjustment permitted by the slots and screws that the right-hand edge of base plate 63ˣ and the right-hand face of magnet block PM engage the face of boss 16ᵖ.

As is better shown in Figures 7 and 12, the signal mechanism may be embodied in larger and more powerful form than that of Figures 1 and 3, and in order to gain certain other advantages the upper pole extension plates 67 and 67ᵇ are provided with an annular paramagnetic sleeve 75 for flux conduction and to provide an internal axial flux gap between the lower end of sleeve 75 and the lower pole extension plates 68 and 68ᵇ, the sleeve 75 surrounding the plunger guide tube 72. With this construction and arrangement of parts it is preferred not to press-fit the guide tube 72, though it serves to align the parts 67ᵇ, 75, 66, and 68ᵇ with the end supporting plates 67 and 68 by which it and they are supported, the guide tube 72 passing through the apertures in each. Its free end is of sufficient length to pass into the housing wall aperture 16ᵃ and as viewed in Figures 7 and 12 its upper end is spun or flanged over, as at 72ᵃ, to abut against the pole plate 67 to hold it against downward movement, and it is held against upward axial movement by the base plate flange 63ʲ which in this form is bent up out of some of the material of base plate 63 that is removed to provide the rectangular aperture 63ʰ in which part of the solenoid winding 15 is accommodated. As in the form of Figure 1, the bent-up flange 63ʲ forms an abutment for one end of the spring 73, but since in the form of Figures 7, 10 and 12 the spring can be shorter, there is interposed between flange 63ʲ and the end of the spring 73 a plug 76 of paramagnetic material.

The signal-actuating mechanism, assembled as a unit, is easily assembled to the housing 16ˣ, being simply set down into the restricted or well-like portion of the housing to bring the base plate 63ˣ to rest on the above-described ledges and other extensions, bringing the parallel slots 63ᶜ and 63ᵉ into alignment with the screw holes for screws 64 and bringing the right-hand face of permanent magnet block PM, as seen in Figure 10, alongside of the housing boss 16ᵖ; the plunger guide tube 72 is entered into the bottom hole 16ᵃ of the housing by simply sliding the signaling unit to the desired extent whereupon the screws 64 are inserted and tightened up, thus fixing the position of the mechanism and confining the permanent magnet block against movement to the right or left as viewed in Figure 10 between the bent-up base plate lugs 63ᵏ and the housing boss 16ᵖ.

The conductors 45, 45 that lead from the winding 15 are connected, as before, to the tabs of the plug connector 41 which in the form of Figures 7 to 12 is also radially displaced, preferably along a vertical diameter but below the center of the latter, as is shown in Figures 7 and 12, being secured as before by screws 44, 44 threaded into bosses 42 and 43 similarly offset below the center, as distinguished from the offsetting radially above the center as in Figures 1 and 3. Correspondingly the insulating separator plate 37 (Figures 7 and 12) has its aperture 37ᵃ similarly displaced downwardly from the center so that the plug prongs 41ᵃ, 41ᵇ project therethrough.

The companion receptacle connector part 38, instead of being secured to the mounting plate above the center as in Figures 1 and 2, is secured below the center as is better shown in Figures 7 and 12, to locate it appropriately for coaction with the similarly downwardly displaced aperture 37ᵃ in the separator plate 37 and with the plug prongs that project therethrough.

As in the first form described, the mounting plate 20ˣ is provided with suitably distributed slots or holes 20ᵍ by which it may be secured on outlet boxes in any suitable or usual form, and with three triangularly disposed holes 20ʰ and detachable spacer elements 48 where it is to be mounted spaced from a wall surface, as shown in Figure 7, and with suitable holes which may be the holes 20ʰ with the spacers 48 knocked off for receiving screws 58 to secure it to a special form of outlet box 52ˣ, in Figure 12, for weatherproof installation, the box 52ˣ being shown in vertical cross-section in Figure 12 and being generally the same as the box 52 of Figure 5, excepting that it is larger and is of modified construction at its periphery for modified coaction with the mounting plate subassembly 20ˣ.

The mounting plate 20ˣ (Figures 7, 8, and 12) may be in the form of a stamping of suitably heavy sheet metal and, as in the earlier form, it is provided with a V-shaped flange 31 whose convex apex coacts with the cushioning and sealing ring 30 which, as before, is seated against the inner face or ledge formed by the housing portion 16ᶠ and is encompassed by the end housing portion 16ᵇ with which the frusto-conical part 31ᵃ of the V-shaped flange 31 may coact by camming the two parts into concentric relation when the housing subassembly is secured to the already installed mounting plate subassembly 20ˣ.

At the upper end of its vertical diameter as viewed in Figures 7, 8, and 12, the mounting plate 20ˣ has a tongue 77 projecting upwardly and beyond the largest circumference of the V-shaped flange 31, as clearly shown in these figures, it may be formed by bending a portion of the outer frusto-conical part 31ᵃ out of the plane of the latter and along a line so as not to interrupt the continuity of the convex apex of flange 31 and which rests against the ring 30. As is better shown in Figures 7, 10, and 12, the casing end portion 16ᵇ is provided with an arcuate slot 78 at the upper end of its vertical diameter and into which the mounting plate tongue 77 enters to an extent which is limited by a lug 79 (see Figures 8 and 9) which is pressed out of the metal of the tongue 77 and is adapted to engage the inner face of the wall portion 16ᵇ, as is better shown in Figures 7 and 12.

Accordingly, with the mounting plate subassembly 20ˣ installed and with the circuit conductors brought through the aperture 20ᶠ and connected to the receptacle member 38, the signaling mechanism and housing 16ˣ subassembly is assembled thereto by first letting the housing downwardly, as viewed in Figures 7, 10, and 12, relative to the mounting plate 20ˣ, while holding the lower portion of the housing assembly canted to the left as viewed in Figures 7 and 12, thus permitting the tongue 77 to enter the housing slot to an extent limited by the lug 79 on the tongue; the lower housing portion is then pressed inwardly, or toward the right, thus subjecting the upper arcuate reaches of the yieldable ring 30 to compression as that inward swinging movement of the housing brings the ledge face seat of ring 30 closer to the convex apex of the V-shaped flange 31 and thus also bringing the screw 25ᵃ, carried by the housing 16ˣ near the lower end of its vertical diameter, into registry with the threaded hole 80 provided in the suitably broadened or deformed portion of the apex of the V-shaped flange 31, as is clearly shown in Figures 7, 8, and 12. The stop lug 79 on the mounting plate tongue 77 acts as a locator to position the housing 16ˣ at the right height to bring the screw 25ᵃ and the threaded hole 80 into registry. The screw 25ᵃ may now be tightened up, thus directly compressing the lower arcuate reaches of the ring 30 and further compressing the upper arcuate reaches thereof by the resultant leverage action where the tongue 77 acts like one end of a lever and the right-hand wall of slot 78 (Figures 7 and 12) acts like a fulcrum.

Thus effective sealing action may be achieved and in an outdoor or weatherproof installation, as in Figure 12, sealed connection to the outlet box 52ˣ is achieved by a gasket 81 of rubber or the like constructed to coact with the V-shaped flange 31 of the mounting plate 20ˣ and with an annular or ring-shaped rib 54ᶠ similar to the rib 54ᵇ of Figure 5 but positioned in the end edge face of the circular box wall 54 so as to provide annular ledges or seats 54ʰ and 54ʲ to either side of the rib 54ᶠ; the latter, moreover, is of a mean diameter about the same as the diameter of the apex of the V-shaped plate flange 31. The gasket 81 is molded to give it an annular recess 81ᵃ into which the box rib 54ᶠ enters and is seated, the resiliency of the side wall portions of this recess 81ᵃ acting to grip the rib 54ᶠ to hold the gasket 81 assembled to the wall box periphery just prior to securing the mounting plate assembly 20ˣ to the outlet box. The mounting plate 20ˣ therefore need only be brought over the gasket 81, with its tongue 77 uppermost and the connector receptacle 38 lowermost, the internal V-shape of the rib 31 neatly seating itself over and against the companion V-shaped portion of the gasket 81 and thus in effect virtually centering the mounting plate subassembly 20ˣ relative to the box 52ˣ and thereby aiding in aligning the screw holes in the two for reception of the securing screws 58. With the three screws 58 tightened up, the gasket 81 is compressed throughout its circular extent and as the screws 58 lessen the spacing between the internal apex of the V-shaped flange 31 and the box rib 54ᶠ, the rib 54ᶠ coacts with the two slanting or frusto-conical wall portions of the V-shaped flange 31 to press the rubber of the ring 81 against these frusto-conical surfaces, thus achieving dependable sealing in addition to the compression of other portions of the gasket ring 81 against other portions of the two parts 20ˣ and 54. With the mounting plate 20ˣ thus assembled to the box 52ˣ, the housing subassembly 16ˣ is then assembled thereto in the manner above described and, as with the embodiment of Figures 1 to 5, sealing is effected on both sides of the mounting plate.

In the two illustrative forms shown in the drawings (Figures 5 and 12) the gaskets 57 and 81 serve the same purpose of providing a seal between an outlet box and the mounting plate supported thereon and each cooperates with the gasket 39 which is between the mounting plate and the laterally extending step or flange 16ᶠ of the housing, to provide an installation well adapted for use for out of doors. Moreover, as shown in the drawings, these parts coact with each other to facilitate assembly of the parts during installation and make for ease and facility of dependable installation; as shown in Figures 5 and 12, the outlet boxes engage the respective gaskets 57 and 81 at the front or forward ends of the annular parts or side walls 54 of the outlet boxes, the different shapes of the two gaskets providing in gasket 57 a shoulder or flange 57ᵃ fitting up around the outside of the V-shaped flange 31 of the mounting plate 20 (Figure 5) while gasket 81 is adapted to fit into the groove or trough formed at the periphery of the mounting plate 20ˣ (Figure 12) by the mutually inclined portions that form the V-shaped flange 31.

It will thus be seen that there has been provided by this invention an apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. Signaling device mounting means comprising a circular mounting plate adapted to be secured to a support at the rear side thereof and having a V-shaped peripheral flange with the apex of the V-shaped flange exposed forwardly of the plate, and a housing of circular cross section having one end open for coaction with said mounting plate and having successive portions of lesser diameter so that it is stepped providing a plurality of setbacks including a plurality of laterally and substantially radially extending wall portions separating wall portions of different diameter extending substantially at right angles to said laterally extending portions, an annular ledge on the inner face of a wall portion intermediate adjacent laterally extending wall portions, and a disk-like separator plate adapted to be received within said housing and to rest against said annular ledge to close off a portion of the interior of said housing from a portion of the interior adjacent the open end thereof, with electro-responsive means within said closed-off portion of the housing, and means for detachably securing said separator plate to said annular ledge, the laterally extending wall portion nearest the open end of the housing being juxtaposed to the apex of said V-shaped flange of said mounting plate with the endmost wall portion of the housing which extends from said last-mentioned laterally extending portion encompassing the said flange on the said mounting plate, and means carried by said last-mentioned laterally extending wall portion of the housing and by said mounting plate respectively for interengaging said housing and said mounting plate.

2. Signaling device mounting means comprising a mounting plate and means for attaching said mounting plate to a support surface, said mounting plate having screw receiving bore means adjacent its periphery which project forwardly of the plane of the plate, and a housing having an open end for coaction with said plate and which is stepped from said open end providing a plurality of setbacks of decreasing cross section in a direction toward the other end of said housing and providing a laterally extending annular wall portion substantially parallel with the support surface on which the device is supported and spaced therefrom by a distance commensurate with the extent of forward projection of said screw-receiving bore means of the mounting plate, said mounting plate being receivable within the open end of said housing with said screw-receiving bore means substantially juxtaposed to said lateral annular wall portion which has extending through it threaded screw means of a length to terminate on the inside of the plane of said open end and adapted to register with the said forwardly projecting bore means adjacent the periphery of said mounting plate for attaching said housing to said mounting plate.

3. The device as claimed in claim 2 provided with a separable plug and socket combination of which one member has means mounting it within said closed-off portion of the housing and adjacent said separator plate and is in electrical connection with said electro-responsive means and the other has means mounting it on said mounting plate in a position adjacent to and directed toward said separator plate, said mounting plate having aperture means for the passage therethrough of circuit conductors whereby the latter may be connected to said other member, said separator plate having a portion cut away to form aperture means to permit coacting assembly of said two members upon assembly of said housing to said mounting plate and to permit separation between said two members upon disassembly of said housing from said mounting plate.

4. The device as claimed in claim 2 in which the mounting plate has a V-shaped annular flange with the apex directed forwardly of the general plane of the plate for entry into the housing in juxtaposition to said lateral annular wall portion, said V-shaped flange projecting in said direction from a substantially flat central portion which is provided with a number of different apertures adapted for attachment to any of a number of known wall outlet boxes.

5. The device as claimed in claim 2 in which the mounting plate has a V-shaped annular flange with the apex directed forwardly of the general plane of the plate for entry into the housing in juxtaposition to said lateral annular wall portion, said V-shaped flange projecting in said direction from a substantially flat central portion which is provided with a number of different apertures adapted for attachment to any of a number of known wall outlet boxes, the aforesaid screw receiving bore means in the periphery of said mounting plate being located in said V-shaped flange substantially along the bisector of the V of the flange.

6. A device of the kind described comprising a housing having an open end which is internally stepped to provide a plurality of internal side wall seats facing toward its open end, a separator plate peripherally seated against one of said seats intermediate of the ends of said housing and relatively adjacent but spaced from said open end to divide the interior of the housing into a relatively shallow portion at said open end of the housing and a relatively deeper portion on the othed side of the separator plate, signalling means comprising electro-responsive means in said deeper portion of the housing and having frame means engaging with and secured to internal step seats of the housing, a mounting plate adapted to be secured to a support and having aperture means for the passage therethrough of conductors, said mounting plate having secured thereto one member of a plug and socket combination, said member being adapted for connection thereto of said conductors and projecting into said shallow portion of the housing upon assembly of the housing to the mounting plate, said housing having secured therein and exposed toward said open end thereof the other member of said plug and socket combination which is connected to said electro-responsive means, and means comprising the open end portion of the housing and an internal seat adjacent thereto for interfitting and securing together said mounting plate and the housing with said companion members of said plug and socket combination mutually alined for coacting assembly of one to the other as the housing is interfitted with and secured to the mounting plate.

7. A housing for an electrically operated signal device comprising a housing having an open end and having electro-responsive means mounted and secured therein together with one member of a plug and socket combination, said member being in electrical connection with said electro-responsive means and exposed toward said open end of the housing, said housing having adjacent its open end an internal seat peripherally surrounded by a flange-like end portion of the housing, a gasket of yieldable material seated against said seat and within said flange-like end portion of the housing, a mounting plate adapted to be secured to a support and having aperture means for the passage therethrough of conductors, said mounting plate being receivable within said flange-like end portion and against said gasket, and means for drawing and securing the housing and mounting plate together to place said gasket under compression, said mounting plate having secured thereto the other member of said plug and socket combination in a position juxtaposed to said first-mentioned member for coacting assembly of the plug prong contact means and the socket contact means thereof in response to movement of assembly of the housing to the mounting plate and continued approaching movement therebetween as said gasket is placed under compression.

8. The device claimed in claim 7 in which said means for drawing and securing the housing and mounting plate together comprises a lateral slot in the flange-like end portion of the housing, said slot being located between the end edge of the latter and the gasket seated against said seat, a laterally projecting tongue on the mounting plate receivable into said slot and which must first be entered therein before said plate is receivable within said flange-like end portion of the housing and which is entered therein in response to initial relative lateral movement between the housing and the mounting plate and thereby also locate the latter over said gasket, said tongue and slot thereafter serving as a fulcrum for relative pivoting movement to enter the mounting plate completely within said flange-like end portion of the housing and thereby lock said tongue and slot against disengagement, and threaded means peripherally displaced from said slot and tongue for pivotally drawing plate and housing together about said fulcrum as an axis and by the resultant leverage action placing said gasket under compression.

9. The device claimed in claim 7 in which the means for drawing and securing the housing and mounting plate together to place the gasket under compression comprises screw means operable from the exterior of the housing and passing through said internal gasket seat and through the gasket itself to coact in holding the gasket assembled to said seat prior to assembly of the housing to the mounting plate and threaded hole means in the mounting plate for receiving said screw means upon reception of the mounting plate within said flange-like end portion of the housing and against said gasket.

10. A mounting for a signal device operating means comprising a cup-like casing and a mounting plate, said plate having a threaded hole adjacent its periphery and, said casing having an annular rim adapted to receive therein and extend around said mounting plate, said annular rim of the casing being spaced from and joined to the remainder of the casing by an inwardly and laterally extending flange, the said flange having a screw hole which may be brought into register with said threaded hole adjacent the periphery of said mounting plate to receive a screw for joining the casing to the mounting plate, the said casing having a slot extending radially through its said annular rim and peripherally spaced from said screw hole, and said mounting plate having a radially extending tongue and similarly peripherally spaced from said threaded hole and adapted to enter said slot whereby to rotatively orient the casing and the plate and to orient the screw hole of the former with the threaded hole of the latter, and a lug on the said tongue positioned to limit the extent to which said tongue can be inserted through said slot and to thereby position the said casing in radial direction relative to said mounting plate so that the screw hole in the said flange in the casing is in register with the said screw hole in the mounting plate.

11. A signal device housing comprising a mounting plate having holes for the passage therethrough of mounting screws, means for mounting the mounting plate on a support comprising hollow spacers at the back of the plate for resting against the support, said spacers being attached to the plate for easy removability by cylindrical parts that extend coaxially into the screw holes in the plate and are shouldered at the ends thereof adjacent the front face of the mounting plate and are deformable for ease of detachment of the spacers where spaced mounting of the plate is not desired, mounting screws passed from the front of said plate through said holes and cylindrical parts and hollow spacers with their headed ends at said shouldered ends and their threaded ends entered into the support to clamp the plate and hollow spacers between the support and their head ends, said mounting plate being thereby mounted in spaced relation from the support to provide space for the passage of conductors therebetween and having aperture means for the passage therethrough of conductors from said space to the front side of the mounting plate, and a casing having therein electro-responsive means in electrical connection with said conductors passed through said aperture means, said casing and said mounting plate having means for securing them together with the casing substantially closing over the front of said mounting plate.

12. A closure and mounting for the operating means of an electric signal device comprising a casing and mounting plate assembly, electric signal-operating means within said casing, said casing having a peripheral seat at one end for receiving peripheral portions of said mounting plate to substantially align the latter with the casing, said mounting plate having means for the passage therethrough of conductive means leading to said signal-operating means, a gasket in said seat, the peripheral portion of said mounting plate having a substantially V-shaped cross-section with the apex of the latter engaging said gasket and with the V-shaped trough-like portion thereof facing away from said casing and toward the support to which said mounting plate is to be secured, a gasket extending throughout said V-shaped trough-like portion and thereby interposed between the mounting plate and the support, and means for securing said casing and mounting plate together and to a support to place said gaskets under compression.

13. A signal device mounting including a housing having therein electro-responsive means, a mounting plate having means for the passage therethrough of circuit conductors and having holes to receive mounting screws from the front side thereof, means for securing the housing to and at the front of the mounting plate, annular spacer studs on the back face of said mounting plate in alignment with said mounting holes respectively with means detachably securing the studs to the mounting plate comprising easily deformable bushings extending into the holes in the mounting plate and into said annular studs respectively, whereby mounting screws may be passed through the bushings and spacers to secure the mounting plate in spaced relation from a support and whereby said annular spacer studs may be easily removed from the mounting plate where mounting of the latter in spaced relation is not desired.

14. A closure and mounting for the operating means of an electric signal device comprising a casing open at its rear end, an outlet box open at its front end, and a mounting plate interposed therebetween, said outlet box having at its open end means forming a substantially peripheral seat for a gasket and a gasket seated thereat, said mounting plate having means for the passage therethrough of conductive means leading from said outlet box into said casing, said casing having a peripheral seat at its said rear end with a gasket seated thereagainst and said mounting plate having a peripheral portion of substantially V-shaped cross-section with the apex of the latter directed toward said casing with said apex engaging said second-mentioned gasket, said first-mentioned gasket and said outlet box seat therefor having coacting peripheral extents to juxtaposition the gasket to a peripherally continuous part of the rear side of said V-shaped peripheral portion of the mounting plate; and means for securing said casing, mounting plate, and outlet box together with said gaskets under compression.

15. A construction as claimed in claim 14 in which said casing is provided with a peripheral flange-like portion that substantially envelopes laterally said V-shaped portion of the mounting plate to bypass it in a direction toward the mounting plate and that extends into direct engagement with said first-mentioned gasket to form a seal therewith.

16. A construction as claimed in claim 14 in which said V-shaped peripheral portion of the mounting plate is formed by two substantially frusto-conical wall portions presenting a V-shaped trough facing toward said outlet box, said peripherally continuous part comprising at least one of said frusto-conical portions for engaging and resting against said first-mentioned gasket.

17. A construction as claimed in claim 14 in which said V-shaped peripheral portion of the mounting plate is formed by two substantially frusto-conical wall portions presenting a V-shaped trough facing toward said outlet box, said peripherally continuous part comprising at least one of said frusto-conical portions for engaging and resting against said first-mentioned gasket and said casing having an end peripheral wall portion substantially enveloping the outermost of said frusto-conical portions of the wall plate and terminating in engagement with said first-mentioned gasket.

18. A construction as claimed in claim 14 in which said V-shaped peripheral portion of the mounting plate is formed by two substantially frusto-conical wall portions presenting a V-shaped trough facing toward said outlet box, said peripherally continuous part comprising both of said frusto-conical portions of the mounting plate for engaging against said first-mentioned gasket.

19. A construction as claimed in claim 14 in which said V-shaped peripheral portion of the mounting plate is formed by two substantially frusto-conical wall portions presenting a V-shaped trough facing toward said outlet box, said first-mentioned gasket having a portion that is externally V-shaped and received in said trough between the frusto-conical portions of the mounting plate to coact in centering the box relative to the mounting plate during assembly, said peripherally continuous part comprising both of the inside faces of said trough.

References Cited in the file of this patent

UNITED STATES PATENTS

| Number | Name | Date |
| --- | --- | --- |
| 1,486,896 | Hubbell | Mar. 18, 1924 |
| 1,603,884 | Van Amberg | Oct. 19, 1926 |
| 1,665,802 | Symmes | Apr. 10, 1928 |
| 1,673,213 | Sukumlyn | June 12, 1928 |
| 2,105,573 | Wilson | Jan. 18, 1938 |
| 2,117,064 | Ketay | May 10, 1938 |
| 2,273,688 | Bolz et al. | Feb. 17, 1942 |